Patented Feb. 22, 1927.

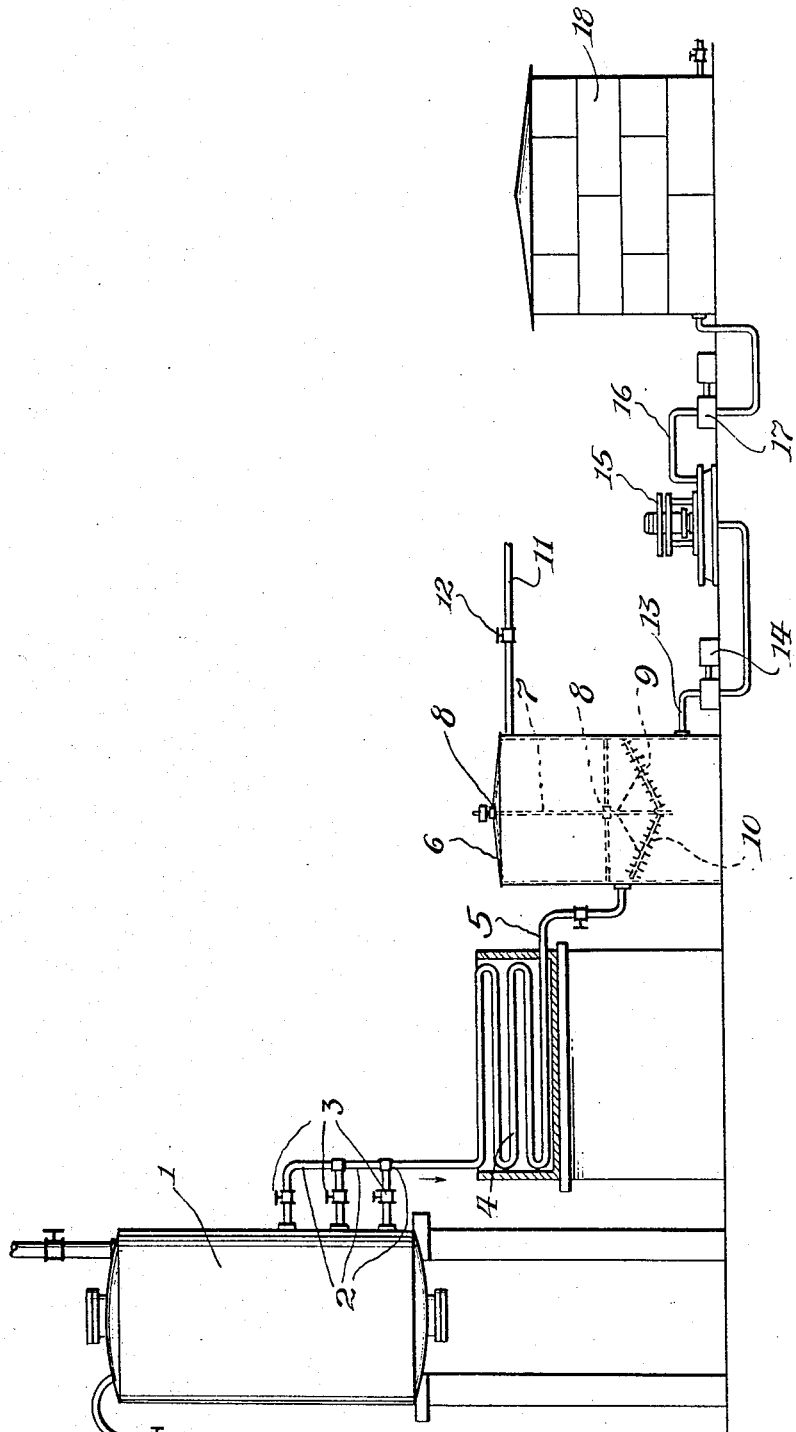

1,618,669

UNITED STATES PATENT OFFICE.

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

TREATMENT OF PETROLEUM RESIDUE.

Application filed June 28, 1926. Serial No. 118,975.

This invention relates to improvements in the treatment of petroleum residue, and refers more particularly to the treatment of heavy liquid residue produced in the cracking of hydrocarbons under cracking conditions of temperature and superatmospheric pressure.

In the cracking of hydrocarbon oils the conditions of operation are so controlled as to produce a residue comprising either a liquid, semi-liquid, or a substantial solid. In the operations which produce a liquid residue, attempts have been made to utilize this liquid residue as a fuel. The use of this liquid residue as fuel has been accompanied with more or less success. However, in some types of liquid residue produced from the cracking of hydrocarbon oils, it has been noted that suspended pitch-forming or coke-like particles will settle in the lines or burners and tend to clog same.

In addition, when this residue is placed in storage the suspended particles have a tendency to precipitate on long standing and agglomerate into a more or less solid condition, making it necessary from time to time to clean the tanks. The operation of removing this accumulated, more or less solid, material is very costly, it being necessary at times to rip out portions of the tank, with costly repairs and great handling costs.

This precipitated mass of previously suspended particles is a waste product at the present time. The present invention has for its primary object to so treat this liquid residue containing these suspended particles as to permit of its use as fuel without clogging or obstructing the pipes or burners, thus utilizing the entire residue as a fuel, eliminating costly handling and loss in waste product.

Briefly describing the present invention, the cracked liquid residue is withdrawn from a cracking plant, cooled only to that point which is consistent with safety from flashing, and passed into a thickener or settling tank. In this settling tank it is subjected to controlled conditions of agitation and segregation of the suspended material which is precipitated, the freed supernatant liquid rising to the top. This freed liquid is then withdrawn, and can be used for fuel in the plant, or can be sold.

The precipitated mass, with the heavier constituents of the residue, is then withdrawn from the lower portion of the separating tank and subjected to a homogenizing action, which disintegrates the suspended particles into a very fine state of division, thus stabilizing the treated material. In the separation of the suspended material in the cracked residuum from the main portion of the liquid in which it is suspended, some of the liquid itself adheres to the particles, so that the settled material is of the consistency of a mud or paste. Homogenization of this paste, which may be in a more or less heavy liquid condition and which contains a very large percentage of suspended material after separation, causes it to be converted into a stable system showing very little tendency to segregation of the suspended particles. The homogenized material, as a whole, has the appearance of a thick cream and shows no tendency to become grainy or agglomerate into a hard, coke-like mass, which would otherwise be the case. This facilitates the handling of the separated carbonaceous and pitch-like particles. This homogenized cream-like substance of pasty consistency may itself be used as fuel either in the plant or may be sold as a special type of marketable fuel. Being stabilized by the homogenizing action, it will not segregate and clog the lines as heretofore explained.

The single figure in the drawing is a diagrammatic side elevational view of one form of apparatus in which the method of the present invention may be carried out.

Referring in detail to the drawings, 1 designates an enlarged reaction or expansion chamber which is part of a standard type of cracking apparatus. Separation of vapors and precipitation of carbon takes place in this chamber. The temperature of reaction may be from 750 or 850 deg. F., more or less, and it may be maintained under the desired superatmospheric pressure of the operation. The heated liquid residue may be withdrawn through the line 2 controlled by the valve 3 and cooled in the cooling coil 4 below that point at which any flashing would take place. There may be any number of liquid draw-off lines disposed along the height of the chamber 1. The valve 3 functions as a pressure reducing valve.

The partially cooled liquid residue may pass from the cooling coil 4 through the transfer line 5 into a tank 6, which may take any form desired to accomplish the step of segregating and precipitating the suspended pitch-forming, coke-like particles from the residue. One form of tank which may be found desirable is the Dorr settling tank, a standard type of settling tank sold on the market. Although it is obvious, of course, that any other kind of tank may be used which will produce the result desired.

Briefly, the tank 6 is provided with the vertical shaft 7 mounted in the bearings 8 and rotated by any suitable means. To the lower end of the vertical shaft 7 is connected upwardly extending arm 9 which may be provided with crossbars or rakes 10. The action within this tank 6 is that of agitation and segregation, the suspended particles precipitating to the bottom and the supernatant liquid rising to the top. This supernatant liquid may be withdrawn through the line 11 controlled by valve 12. The freed liquid withdrawn through line 11 may be sent to storage and sold as a marketable fuel oil free from any substantial portion of suspended particles, or it may be utilized in the cracking plant as fuel.

The residue settlings, including carbonaceous matter, pitchy materials, together with accompanying heavy oil, are withdrawn from the lower portion of the tank 6 through the line 13, in which may be interposed the pump 14. This pump 14 delivers this mixture to the homogenizer designated 15. In the homogenizer 15 this heavy mixture is subjected, as heretofore described, to a disintegrating, stabilizing action producing a paste-like mass of creamy consistency which exhibits no tendency to precipitate any substantial amount of objectionable particles nor become grainy in consistency. This cream-like mass may be withdrawn from the homogenizer through the line 16, in which is interposed the pump 17, and passed to any suitable storage tank 18. From the tank 18 it is obvious that it may be withdrawn for fuel in the plant or it may be sold as a special type of marketable fuel.

By the term homogenizing action is meant the dispersing of the suspended particles to a more or less uniform state by breaking up the larger particles into smaller particles. This is accomplished by forcing material through restricted passages under pressure; by subjecting the material to the shearing action of moving surfaces or a moving and stationary surface working in close relation with each other, and in general subjecting the particles to a strain which tends to break them down into smaller particles.

I claim as my invention:

1. A process of the character described comprising subjecting cracked liquid petroleum residue containing suspended pitch-forming, coke-like particles to a segregating action to separate the suspended particles from the liquid medium, in separately withdrawing the freed liquid, in then separately withdrawing the precipitated particles with accompanying oily liquid and subjecting same to a homogenizing action whereby the suspended particles are substantially stabilized and the mixture assumes a creamy consistency.

2. A process of the character described comprising subjecting cracked liquid petroleum residue containing suspended pitch-forming, coke-like particles to a segregating action to separate the suspended particles from the liquid medium, in separately withdrawing the freed liquid, in then separately withdrawing the precipitated particles with accompanying oily liquid and subjecting same to a homogenizing action whereby the suspended particles are substantially stabilized and the mixture assumes a creamy consistency, and utilizing the homogenized material for fuel.

3. A process of the character described comprising withdrawing and subjecting liquid residue from an oil cracking operation while still in heated condition to a segregating action to separate and precipitate suspended solid and semi-solid particles from the liquid medium, in separately withdrawing the freed liquid, in withdrawing the precipitated particles, together with accompanying oily liquid and subjecting same to a stabilizing action whereby the particles are stabilized and a substance of cream-like consistency produced.

JACQUE C. MORRELL.